Feb. 21, 1933.　　　　R. M. NELSON　　　　1,898,257
GAUGE
Filed Jan. 4, 1930

Inventor
Ralph M. Nelson
Knis Hudson & Kent
attys.

Patented Feb. 21, 1933

1,898,257

UNITED STATES PATENT OFFICE

RALPH M. NELSON, OF CLEVELAND HEIGHTS, OHIO

GAUGE

Application filed January 4, 1930. Serial No. 418,519.

This invention relates generally to indicating devices, and more particularly to pressure indicating gauges of the type having a flexible pressure responsive element.

Gauges of this type now being extensively used employ a Bourdon tube as a flexible element. Frequently these gauges are used on pipe lines or chambers in which pressures fluctuate rapidly or violently, as, for example, passages or chambers connected to the discharge side of certain pumps and to hydraulic accumulators. These rapid or violent fluctuations or pulsations in the pressure medium cause corresponding vibrations or deflections of the flexible element, with the result that these elements soon fail. These deflections of the pressure responsive element also subject other parts of the gauge to wear and, in addition, make the reading of pressure indications very difficult.

During use of pressure gauges of this type, the Bourdon tube elements are frequently subjected to overloads by pressure increases in the external medium above the pressure values for which the gauges are intended. When thus overloaded, the pressure responsive element may be deflected beyond its elastic limit and its accuracy and usefulness destroyed.

It is therefore an object of this invention to provide an improved and more durable form of indicating device which will give accurate indications.

Another object of this invention is to provide an indicating device having compact and simplified means for dampening vibrations of the parts.

A further object of this invention is to provide an indicating device having means for protecting the pressure responsive element against overload.

The invention may be further briefly summarized as consisting in certain novel combinations and arrangements of parts hereinafter described and particularly set out in the appended claims.

In the accompanying sheet of drawing.

Figure 1:
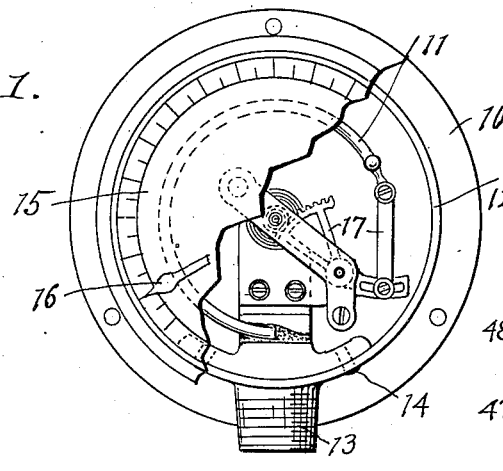
Figure 1 is a front elevational view, with parts broken away, showing a pressure gauge embodying my invention.

In the drawing illustrating my invention, I have shown a pressure gauge 10 of the type having a flexible tubular pressure responsive element 11 commonly known as a Bourdon tube. This element is housed within the casing 12 and is supported on the inner end of the gauge stem 13 which may be secured to the casing in any desired manner, as by means of screws 14. A dial 15 is suitably supported and is provided with a scale representing various pressure values. A movable pointer 16 is connected by suitable linkage 17 to the free end of the pressure responsive element so that deflections of this element in response to pressure changes will be visually indicated in a well known manner.

Figure 2:
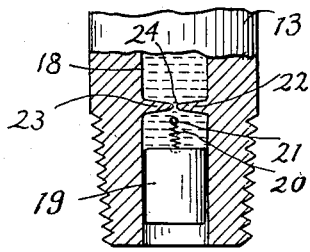
Fig. 2 is a longitudinal sectional view showing a portion of the gauge stem on an enlarged scale.

A passage 18 extending axially within the gauge stem communicates with the interior of the pressure responsive element so as to transmit pressure to this element from an external pressure medium. The passage 18 and the pressure responsive element are filled with a suitable substance, such as oil or other liquid, through which the pressure is transmitted from the external pressure medium to the interior of the pressure responsive element. This body of liquid may be retained within the passage and the element connected thereto by any suitable means which will permit pressures to be readily transmitted from the external medium to the pressure responsive element. In Fig. 2 of the drawing, I have shown as such means a plunger 19 slidably mounted in the lower portion of the passage 18. This plunger retains the body of liquid within the passage and separates the liquid from the external pressure medium. For normally maintaining the plunger in proper position with respect to the body of liquid retained in the device, I provide a coil spring 20 having one end connected to the plunger and the other end thereof attached to a pin 21 mounted in the stem so as to extend across the passage 18. At atmospheric pressure, this spring normally holds the plunger in proper place, but when changes occur in the external pressure medium, the spring permits sliding movement of the plunger.

I have found that objectionable vibrations of the pressure responsive element can be prevented if sudden pressure changes in the external medium can be transmitted to the pressure responsive element in such a way as to make these pressure changes be felt gradually within this element. To accomplish this result, I provide a restriction 22 in the passage 18. This restriction may be formed during the drilling of the stem by leaving a wall of material 23 between upper and lower portions of the passage 18. Obviously, however, this restriction could be a separate part pressed into or otherwise secured in this passage. The opening 24 of the restriction is of greatly reduced area in comparison with the area of the passage 18, and I have found that best results are obtained when the area of this passage is substantially proportioned to the viscosity of the liquid retained in the passage. That is to say, when a limpid fluid, such as water, is used in the passage, the area of the opening 24 must be very small to produce the desired dampening effect. When a more viscous fluid is used, such as oil, the opening 24 must be made of correspondingly larger area. To more fully appreciate the dampening effect produced by the restriction 22, it is pointed out that for a limpid fluid, such as water, I contemplate making the opening 24 approximately five-thousandths of an inch in diameter. However, in determining the size of the restricted opening and the viscosity of the fluid to be used therewith in a gauge for a particular duty, the degree of pressure change and the violence or suddenness of the pressure change in the external medium, are factors which would be taken into consideration because the rate at which the liquid will flow through the restricted opening is dependent upon such factors as the size of the restricted opening, the viscosity of the fluid, the degree of pressure change and the violence of the pressure change.

When an increase in pressure occurs in the external medium, the force applied to the plunger 19 causes some of the body of fluid in the passage 18 to be forced through the opening of the restriction 22, thus causing the pressure responsive element to be correspondingly deflected. When a decrease in pressure occurs in the external medium, the flexible pressure responsive element forces some of the liquid back through the opening of the restriction. The transfer of some of the body of liquid through the opening 24 takes place gradually because of the greatly reduced area of this opening. The gradual transfer of fluid through this reduced opening causes pressure changes to be felt gradually within the pressure responsive element and this dampening or throttling effect prevents the pressure responsive element from being vibrated in response to rapid or violent fluctuations in the pressure of the external medium.

Figure 3:
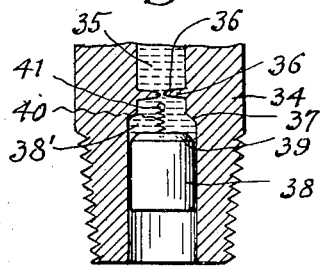
Fig. 3 is a longitudinal sectional view showing another form of gauge stem.

In Fig. 3 of the drawing I show an arrangement which is somewhat similar to the arrangement shown in Fig. 2. In this arrangement the stem 34 is provided with a passage 35 having a restriction 36 therein. Below the restriction 36 the wall of the passage 35 is provided with an annular inclined shoulder 37 which forms a stop for limiting the movement of the plunger 38. The upper end of the plunger is provided with a tapered portion 39 which seats against the annular shoulder 37 when the plug has been moved by the pressure of the external medium having reached a predetermined value. In moving into engagement with the annular shoulder 37, the plunger 38 displaces a definite volume of the body of liquid 38' confined in the passage and forces this volume into the pressure responsive element. The parts of the device are so proportioned that when this displaced volume of liquid has been forced into the pressure responsive element the latter will be deflected an amount corresponding with the maximum pressure indication for which the gauge is intended. The seating of the plunger prevents more than the predetermined, definite volume of fluid from entering the pressure responsive element, so that by limiting the extent of movement of the plunger 38 an abnormally large increase in pressure in the external medium will not be transmitted to the pressure responsive element. If the abnormal pressure of the external medium continues for a prolonged interval of time, the plunger is held seated by the pressure during such interval. This element is thus protected from being distorted beyond its elastic limit by abnormal increases in pressure, and is protected from overload for the duration of the abnormal pressure condition.

For normally holding the plunger in proper position within the passage, I provide a coil spring 40 having one end connected to the plunger 38 and the other end connected to a pin 41 mounted in the walls of the stem and extending across the passage.

Figure 4:
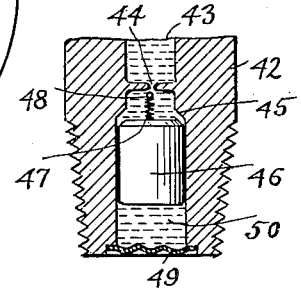
Fig. 4 is a longitudinal sectional view showing still another form of gauge stem.

The pressure medium, with which gauges of this type are sometimes used, may contain foreign particles which might adhere to the walls of the lower portion of the passages 18 and 35, shown in Figs. 2 and 3 respectively, and prevent free movement of the plungers mounted in these passages. To prevent foreign matter from entering these passages, and to provide means for retaining the liquid within the passages during shipment or storage of the gauges, it may be advisable to provide a flexible diaphragm across the lower end of the passages. In Fig. 4 I have shown a stem of the movable plunger form shown in Figs. 2 and 3, in which such a diaphragm has been incorporated. In this construction a stem 42 is provided with a passage 43 having a restriction 44 therein. Below the restriction the wall of the passage is formed with an inclined annular shoulder 45 which forms a stop for limiting the movement of the plunger 46 in the manner already described in connection with Fig. 3. A spring 47 having one end thereof secured to the pin 48 and its other end secured to the plunger retains the latter in proper position at zero pressure. A diaphragm 49 is mounted adjacent the lower end of the stem so as to close the passage 43. The diaphragm prevents escape of the body of liquid 50 and prevents foreign matter from entering the passage and interfering with the movement of the plunger.

It will now be readily seen that I have provided a form of pressure gauge having simple, compact, and efficient means for preventing fluctuations or vibrations of the pressure responsive element in response to rapid or violent pressure changes occurring in the external medium. It will also be readily seen that I have provided novel means for protecting the flexible pressure responsive element from being distorted beyond its elastic limit by abnormal increases in the pressure of the external medium.

In disclosing my invention I have referred to a pressure gauge having a Bourbon tube type of pressure responsive element, however, it should be understood that the principles of my invention may also be embodied in gauges employing pressure responsive elements of other forms. Likewise, while I have shown a gauge having only one pressure responsive element, obviously my invention may be applied to gauges having more than one of these elements such as differential gauges.

While I have shown and described the device of my invention in a detailed manner, it should be understood, however, that I do not intend to limit myself to the precise details shown and described, but regard my invention as including such changes and modifications as do not involve a departure from the spirit of the invention and the scope of the appended claims.

Having thus described my invention, I claim:

1. In an indicating device, the combination of a pressure responsive element, means for visibly indicating deflections of said element, a body having a passage communicating with said element, a body of liquid in said element and said passage for transmitting pressure to said element from an external medium, a movable member separating said body of liquid from said external medium, and means for limiting the movement of said member to protect said element against overload.

2. In an indicating device, the combination of a pressure responsive element, means for visibly indicating deflections of said element, a body having a passage communicating with said element, a body of liquid in said element and said passage for transmitting pressure to said element from an external medium, a plunger slidable axially in said passage and separating said body of liquid from said external medium, and means for limiting the movement of said plunger to protect said element against overload.

3. In an indicating device, the combination of a pressure responsive element, means for visibly indicating deflections of said element, a body having a passage communicating with said element, a body of liquid in said passage and said element, means restricting the movement of liquid in said passage, a slidable plunger in said passage separating said body of liquid from an external medium, and means for normally holding said plunger in place at atmospheric pressure.

4. In an indicating device, the combination of a pressure responsive element, means for visibly indicating deflections of said element, a body having a passage communicating with said element, a body of liquid in said element and said passage for transmitting pressure to said element from an external medium, a movable member separating said body of liquid from said external medium, and spring means for normally holding said member in proper position at atmospheric pressure.

5. In an indicating device, the combination of a pressure responsive element, means for indicating deflections of said element, a body having a passage communicating with said element, a restriction in said passage having an opening therethrough of reduced area, a body of liquid in said passage for transmitting pressure to said element from an external medium, the area of said opening being substantially proportioned to the viscosity of said liquid, a movable member separating said body of liquid from said external medium, and means for limiting the movement of said member to protect said element against overload.

6. In an indicating device, the combination of a pressure responsive element, means for indicating deflections of said element, a body having a passage communicating with said element, a restriction in said passage having an opening therethrough of reduced area, a body of liquid in said passage for transmitting pressure to said element from an external medium, the area of said opening being substantially proportioned to the viscosity of said liquid, a movable member separating said body of liquid from said external medium, means for normally holding said member in place at atmospheric pressure, and means for limiting the movement of said member to protect said element against overload.

7. In an indicating device, the combination of a pressure responsive element, means for visibly indicating deflections of said element, a body having a passage communicating with said element, fluid in said passage for transmitting pressure to said element from an external medium, and means for closing said passage when a predetermined volume of said fluid has been forced into said element by the pressure of said external medium.

8. In an indicating device, the combination of a pressure responsive element, means for visibly indicating deflections of said element, a body having a passage communicating with said element, a body of liquid in said element and said passage for transmitting pressure to the element from an external medium, a member movable in said passage in contact with said liquid, means for limiting the movement of said member to protect said element against overload, and flexible means sealing said passage to confine said liquid therein.

9. In an indicating device, the combination of a pressure responsive element, means for visibly indicating deflections of said element, a body having a passage communicating with said element, a body of liquid in said element and said passage for transmitting pressure to the element from an external medium, a plunger slidable axially in said passage in contact with said liquid, means for limiting the movement of said plunger to protect said element against overload, means normally positioning said plunger in said passage with respect to said limiting means, and flexible means sealing said passage to confine said liquid therein.

In testimony whereof, I hereunto affix my signature.

RALPH M. NELSON